United States Patent
Xie et al.

(10) Patent No.: US 11,773,002 B2
(45) Date of Patent: Oct. 3, 2023

(54) METHOD TO PREPARE THREE-DIMENSIONAL TRANSPARENT GLASS VIA POLYMER PLASTICITY

(71) Applicant: ZJU-Hangzhou Global Scientific and Technological Innovation Center, Zhejiang (CN)

(72) Inventors: Tao Xie, Zhejiang (CN); Ning Zheng, Zhejiang (CN); Yang Xu, Zhejiang (CN); Qian Zhao, Zhejiang (CN)

(73) Assignee: ZJU-Hangzhou Global Scientific and Technological Innovation Center, Zhejiang (CN)

( * ) Notice: Subject to any disclaimer, the term of this patent is extended or adjusted under 35 U.S.C. 154(b) by 575 days.

(21) Appl. No.: 17/013,848

(22) Filed: Sep. 7, 2020

(65) Prior Publication Data
US 2021/0363047 A1     Nov. 25, 2021

(30) Foreign Application Priority Data

May 19, 2020    (CN) .......................... 202010425140.9

(51) Int. Cl.
| | |
|---|---|
| C03B 19/00 | (2006.01) |
| C03B 19/01 | (2006.01) |
| C03B 20/00 | (2006.01) |
| C03C 3/04 | (2006.01) |
| C03B 19/06 | (2006.01) |

(52) U.S. Cl.
CPC .............. *C03B 19/01* (2013.01); *C03B 19/00* (2013.01); *C03B 19/06* (2013.01); *C03B 20/00* (2013.01); *C03C 3/04* (2013.01); *C03C 2201/60* (2013.01)

(58) Field of Classification Search
CPC ............................................. C03B 19/06–066
See application file for complete search history.

(56) References Cited

U.S. PATENT DOCUMENTS

2020/0039868 A1    2/2020  Rapp et al.

FOREIGN PATENT DOCUMENTS

CN      107500732      12/2017

OTHER PUBLICATIONS

Kotz et al. Glassomer—Processing Fused Silica Glass Like a Polymer. Advanced Materials, 30, 1707100 (2018). (Year: 2018).*

(Continued)

*Primary Examiner* — Erin Snelting
(74) *Attorney, Agent, or Firm* — JCIP GLOBAL INC.

(57) ABSTRACT

The present disclosure provides a method to fabricate three-dimensional transparent glass utilizing polymer plasticity, including the following steps. In step 1, synthesize polymer-glass powder composite containing dynamic chemical bonds, the bond exchange catalyst is added during the synthesis process, and then cure to obtain a two-dimensional sheet shape I, the bond exchange catalyst is used to activate a dynamic chemical bond in step 2. In step 2, shape the two-dimensional sheet shape I obtained in step 1 into a complex three-dimensional shape II under the conditions of the effect of an external force and the activable dynamic chemical bond. In step 3, pyrolyze the composite precursor at high temperature to obtain transparent glass with complex three-dimensional shape II. The present disclosure provides a method in shaping the transparent glass with complex geometries by unique polymer plasticity in lower temperature.

10 Claims, 1 Drawing Sheet

(56) References Cited

OTHER PUBLICATIONS

Zheng et al. Mechano-Plastic Pyrolysis of Dynamic Covalent Polymer Network toward Hierarchical 3D Ceramics. Advanced Materials, 31, 1807326 (2019). (Year: 2019).*

Liu et al. Origami and 4D printing of elastomer-derived ceramic structures. Science Advances 4: eaat0641 (2018). (Year: 2018).*

CN 107500732 A (Xie) Dec. 22, 2017 (English language machine translation). [online] [retrieved May 3, 2023]. Retrieved from: Espacenet. (Year: 2017).*

Frederik Kotz et al., "Three-dimensional printing of transparent fused silica glass," Nature, vol. 544, Apr. 20, 2017, pp. 337-339.

* cited by examiner

METHOD TO PREPARE THREE-DIMENSIONAL TRANSPARENT GLASS VIA POLYMER PLASTICITY

CROSS-REFERENCE TO RELATED APPLICATION

This application claims the priority benefit of China application serial no. 202010425140.9, filed on May 19, 2020. The entirety of the above-mentioned patent application is hereby incorporated by reference herein and made a part of this specification.

BACKGROUND

Technical Field

The disclosure relates to the field of glass processing, particularly a method to prepare transparent glass with complex three-dimensional structures utilizing the polymer plasticity.

Description of Related Art

Glass, owing to its high hardness, excellent thermal and chemical stability, and outstanding optical properties, is widely used in industrial and research fields especially the aerospace and military field. However, the characteristic of high mechanical strength and the brittle nature of glass makes it hard to fabricate glass with complex three-dimensions due to the poor machining property, particularly sharp angles and suspended structures without supports. Conventional glass fabrication mainly adopts gas refining and electric melting, which is difficult to prepare complex three-dimension structures. Glass with complex three-dimensional shapes can be prepared by molding. However, it is very difficult to prepare molds themselves with complex geometries, and the sharp structures are easy to be damaged while demolding.

Patent CN 107500732 A represented a method for effectively preparing ceramics with three-dimensional structures via the plasticity of ceramic precursor elastomers. The plasticity was obtained by bond exchange of the dynamic chemical bonds. However, this method can only prepare non-transparent ceramics because the left of pyrolyzed Si—O organics originated from ceramic precursors still left in the materials. Meanwhile, it's hard to prepare sharp structures due to the softness of precursor elastomer. Although the ceramics and glass are both inorganic non-metallic materials with excellent mechanical property, there are still many differences between them. First, the phase compositions are different. The phases in ceramics, most of which are anisotropic, include crystal phase, glassy phase, and pore phase, while the glass is isotropic and is composed of a single glassy phase. Therefore, the glass is usually amorphous and ceramics are crystalline or polycrystalline. Secondly, the fabrication procedures and conditions are different. The preparation process of ceramics includes batching, forming, drying, baking, etc., while the preparation process of glass includes batching, melting, forming and heat treatment. The forming temperature of ceramics is generally lower than that of glass. Furthermore, their performances and applications are also different. The excellent optical property of glass has broad applications in the optical field, while ceramics with superior dielectric properties have great potential in the dielectric field.

Other available methods are also applied to three-dimensional glass. Patent US2020/0039868 A1 combines polymer and glass fine powder using cutting, grinding and other methods to prepare geometric shapes, but the shape complexity is not high. The paper of Three-dimensional printing of transparent fused silica glass introduces 3D printing to preparing glass devices with complex three-dimensional structures, which solves the problem of shape complexity to a certain extent. However, this method also has the following problems: 1) Because of the layer-by-layer principle of 3D printing, the surface of the prepared device with complex geometry has a rough surface, which means subsequent difficult polishing; 2) Suspended structures made by 3D printing need supports, which need to be removed later. The removal of supports may damage the printed devices.

Therefore, it's difficult to fabricate complex three-dimensional transparent glass with sharp structures or suspended structures without supports.

SUMMARY

The object of the present disclosure is to provide a method for preparing three-dimensional transparent glass through polymer plasticity, which could fabricate transparent glass with complex three-dimensional shapes at lower temperature via polymer plasticity.

The present disclosure provides a method for preparing three-dimensional transparent glass through polymer plasticity, including the following steps:

Step 1: Synthesize polymer-glass powder composite containing dynamic chemical bonds, the bond exchange catalyst is added during the synthesis process, and then cure to obtain a two-dimensional sheet shape I;

The bond exchange catalyst is used to activate a dynamic chemical bond in step 2.

Step 2: Shape the two-dimensional sheet shape I obtained in step 1 into a three-dimensional shape under the conditions of the effect of the external force and the activable dynamic chemical bond, so as to obtain composite precursor with complex three-dimensional shape II;

Step 3: Pyrolyze the composite precursor at high temperature to obtain transparent glass with complex three-dimensional shape II.

Amongst, in step 1, the polymer-glass powder composite can be obtained after synthesizing the polymer with dynamic chemical bonds and adding glass powder.

In step 1 of the present disclosure, the dynamic bonds in the polymer-glass powder composite can be dynamic covalent or non-covalent bonds. Amongst, the dynamic covalent bonds can be ester bonds, diene addition bonds, disulfide bonds, urethane bonds, alkoxyamine bonds, thioether, trithiocarbonate, carbon-carbon bonds, acylhydrazone bonds, oxime bonds, urea bonds, thiourea bonds, borate bonds, boroxine bonds, selenoether, diselenide, etc. Preferably, ester bonds can be chosen. The dynamic non-covalent bonds can be hydrogen bonds, ionic bonds, delocalized $\pi$ bonds, etc. Preferably, hydrogen bonds can be chosen.

Preferably, the dynamic chemical bond of the polymer can be introduced into the network via synthesizing in chemical reaction, or via copolymerizing monomer containing dynamic bonds. The reaction types can be free radical polymerization, anionic polymerization, cationic polymerization, coordination polymerization, functional group reactions, etc.

Preferably, the polymer containing dynamic bonds can be prepared by functional group reactions like, but not limited to, esterification, hydroxyl (amino) isocyanate reactions, anhydride (amino, carboxyl)-epoxy reactions, Diels-Alder (D-A) reactions, etc.

More preferably, the composite can be prepared by esterification through compounds containing hydroxyl and carboxyl. The reaction occurs at 80-180° C. for 1-10 h with 0.01 wt %-5 wt % catalyst. The types of the catalyst can be dicyclohexylcarbodiimide, N, N'-diisopropylcarbodiimide, 4-dimethylaminopyridine, etc. The reaction formula is represented by Reaction formula 1.

Reaction formula 1

More preferably, the composite can be prepared through compounds containing epoxy and amino or anhydride (carboxyl). The reaction occurs at 80-180° C. for 1-10 h with 0.01 wt %-5 wt % catalyst. The types of the catalyst can be dicyclohexylcarbodiimide, N, N'-diisopropylcarbodiimide, 4-dimethylaminopyridine, etc. The reaction formula are respectively represented by Reaction formula 2 and 3.

Reaction formula 2

Reaction formula 3

More preferably, the composite can be prepared by D-A reactions. The reaction occurs at 40-80° C. for 1-10 h. The reaction formula is represented by Reaction formula 4.

Reaction formula 4

Preferably, monomer containing dynamic bonds can be copolymerized into the polymer network through the reaction of active groups. The active groups can be, but not limited to, (meth) acrylate, vinyl, sulfhydryl, amino (primary, secondary, tertiary), hydroxyl, carboxyl, isocyanate, carbonyl, ether, amide, phosphite, sulfonyl, sulfinyl, thiocyanate, etc.

More preferably, the polymer containing dynamic bonds can be prepared by radical polymerization through compounds containing (meth) acrylate groups. The reaction occurs at 80-120° C. with heat initiator or under UV irradiation for 10 s-10 min with the photoinitiator, while the content of the initiator is ranging from 0.01 wt % to 5 wt %. The types of the initiator can be photoinitiator 819, photoinitiator 2959, azobisisobutyronitrile, dibenzoyl peroxide, etc.

The reaction formula is represented by Reaction formula 5.

Reaction formula 5

More preferably, the polymer containing dynamic bonds can be prepared by thiol-ene reactions or Michael addition reactions through compounds containing sulfhydryl and vinyl or (meth) acrylate. The reaction occurs at 60-120° C. with 0.01 wt %-5 wt % base catalyst. The types of the base catalyst can be triethylamine, 1,8-diazabicycloundec-7-ene, 1,5,7-triazide bicyclo (4.4.0) dec-5-ene, etc. The reaction formula is represented by Reaction formula 6.

Reaction formula 6

Preferably, the polymer containing dynamic bonds can be prepared by anionic polymerization through compounds containing end groups of ethylene oxide. The reaction occurs at 60-120° C. or under UV irradiation for 10 s-10 min with 0.01 wt %-5 wt % initiator. The types of the initiator can be AlCl$_3$, BF$_3$, sulfonium salt, etc. The reaction formula is represented by Reaction formula 7.

Reaction formula 7

Reaction formula 8

In step 1 of the present disclosure, the types of the glass powder can be, but not limited to, quartz glass powder, borosilicate glass powder, aluminosilicate glass powder, soda-lime glass powder, lead silica glass powder, and sodium boron glass powder. The particle size of the glass powder is in the range of 10 nm-100 μm, and the mass fraction of the glass powder in the total mass of the composite is 5%-80%, where 40% is further preferred.

Different functional components can also be added in the composite, such as color components ($Cr(NO_3)_3$, $VCl_3$, $AuCl_3$, etc.), conductive components (graphite, carbon black, metals, etc.) and magnetic components (Fe, Co, Ni, and their alloys, rare earth elements and their alloys, Mn and its compounds, etc.), which diversify the functions of complex three-dimensional glass.

In step 2 of the present disclosure, the complex three-dimensional shapes can be made using origami or kirigami technique. The origami and kirigami process can not only shape single composite but also combine different composites to form complex three-dimensional shapes. The basic fabricating methods of origami include, but not limited to, valley fold, mountain fold, sinking, rolling, crimp fold, pleat fold, and reverse fold. The shapes fabricated by origami can be, but not limited to, Miura Fold, Yoshimura Mode, Triangle Helix, Torsion Box, sailboat base, frog base, windmill base, fish base, bird base and waterbomb base, etc. The kirigami process includes, but not limited to, folding, incised carving/raised carving, piercing, dot dyeing, color filling, wood printing, inkjet printing, sketching, color knitting, etc. The origami/kirigami process can be operated either manually or by instruments according to a set procedure. For example, either a die cutter or a laser cutter is suitable.

After kirigami/origami deformation, the shape of the composite needs an external force to fix to facilitate subsequent plastic deformation. The polymer network fixed by the external force is in a state of decreasing entropy due to dynamic bonds, while the rearrangement of the network topology tends to the state of maximum entropy. Under the activating conditions of dynamic bonds, the stress relaxation of the polymer network will lead the shape from temporary to permanent.

The methods of activating the dynamic bonds are related to the bond types. Different dynamic bonds have different bond exchange temperatures, which are also related to the types and content of the used catalyst.

Preferably, the types of used catalyst can be, but not limited to, one or more of calcium salts, magnesium salts, aluminum, and its compounds, tin and its compounds, titanates, zirconates, organic acids/bases, and inorganic acids/bases.

More preferably, the composite containing ester bonds needs to be treated at 80-160° C. for 10 min to 72 h with 0.1 wt % to 5 wt % catalyst. The types of the catalyst can be, but not limited to, 1,8-diazabicycloundec-7-ene, 1,5,7-triazide bicyclo (4.4.0) dec-5-ene, dibutyltin dilaurate, etc. The reaction formula is represented by Reaction formula 8.

More preferably, the composite containing urethane bonds needs to be treated at 60-150° C. for 10 min to 72 h with 0.1 wt % to 5 wt % catalyst. The types of the catalyst can be, but not limited to, stannous octoate, dibutyltin dilaurate, triethylamine, etc.

In step 3 of the present disclosure, pyrolysis at high temperature is to remove the polymer in the composite while sintering glass powders to obtain transparent glass with complex three-dimensional shapes. The pyrolysis program at high temperature is related to the decomposition temperature of the polymer and the sintering temperature of glass powders, and the pyrolysis temperature of the polymer-glass powder composite is 400-1500° C. Preferably, the decomposition temperature of the polyester in polymer-quartz glass powder composite is 400° C., and the sintering temperature of the glass powder is 1200° C.

During the pyrolysis at high temperature, the sintering aid helps to form the porous structure and leads to the multi-level thermal decomposition, facilitating subsequent volume shrinkage and reducing the generation of cracks. The boiling point of the sintering aid is usually lower than the decomposition temperature of the polymer. After the pyrolysis of the polymer, the green body can be transparent or opaque, depending on both the decomposition temperature of the chosen polymer and the melting point of chosen glass. The opacity is because of the large gap between the glass powders where the light is difficult to transmit. For the opaque green body, high-temperature vacuum heat treatment can be performed to further facilitate the sintering of the glass powders, reducing the surface energy of the green body and driving to transparency finally. The transparency of the resulting glass ranges from 20% to 100%.

Preferably, the types of sintering aid with a high boiling point can be, but not limited to, one or more of phenoxyethanol, diphenyl ether, dimethylacetamide, and diethylene glycol dibenzoate.

Compared with the prior art, the beneficial effects of the present disclosure are described below.

The present disclosure can not only fabricate transparent glass with complex three-dimensional shapes at lower temperature via polymer plasticity but also obtain the glass with special shapes which are hard to prepare through normal methods by using origami/kirigami, such as sharp folding angles, unsupported suspended structures, etc., which will expand the potential applications of glass devices. The preparation method of the present disclosure has a wide variety of optional materials and the process is simple without subsequent grinding.

DESCRIPTION OF THE EMBODIMENTS

The examples below serve for further explanation of the present disclosure, with no restriction thereto.

Example 1 (Ester Bonds, the Dynamic Bond Contained in the Molecule which is Introduced into the Network)

The reagent and the source thereof used in Example 1 is represented in Table 1 below.

TABLE 1

| used reagent | molecular formula | manufacturer |
| --- | --- | --- |
| poly(caprolactone) diacrylate (PCL) $M_n$ = 2000 | $C_4H_8O_3(C_6H_{10}O_2)_n$ | Sigma-Aldrich China |
| 2-isocyanatoethyl acrylate | $C_6H_7NO_3$ | TCI shanghai |
| dibutyltin dilaurate (DBTDL) | $C_{32}H_{64}O_4Sn$ | J&K Scientific |
| butyl acrylate | $C_7H_{12}O_3$ | TCI shanghai |
| phenoxyethanol (POE) | $C_8H_{10}O_2$ | Shanghai Aladdin Bio-Chem Technology |
| silica powder R972 | $SiO_2$ | EVONIK |
| Irgacure 2959 | $C_{12}H_{16}O_4$ | Sigma-Aldrich China |

Synthesis of Poly(Caprolactone) Diacrylate (PCLDA):

30 g of poly(caprolactone) diacrylate, 6.25 g of 2-isocyanatoethyl acrylate and 0.25 g of DBTDL were dissolved into 150 ml of toluene. Then the mixture was stirred for 6 h under $N_2$ atmosphere at 80° C. After then, white precipitation was obtained by mixing the solution and 500 ml of methanol. Finally, the precipitation after suction filtration was vacuum dried for 24 h to obtain PCLDA.

Synthesis of Polymer-Glass Powder Composite Containing Ester Bonds:

6 g PCLDA, 0.6 g of hydroxybutyl acrylate, 1 g of phenoxetol, 0.03 g of DBTDL, 0.06 g of Irgacure 2959 and 3.6 g of silica R972 were introduced into 10 g of N,N-dimethylformamide. Then the precursor liquid was poured into mold and treated for 1 min by UV light with 385 nm, so as to obtain the polymer-glass powder composite containing ester bonds.

Figure 1:
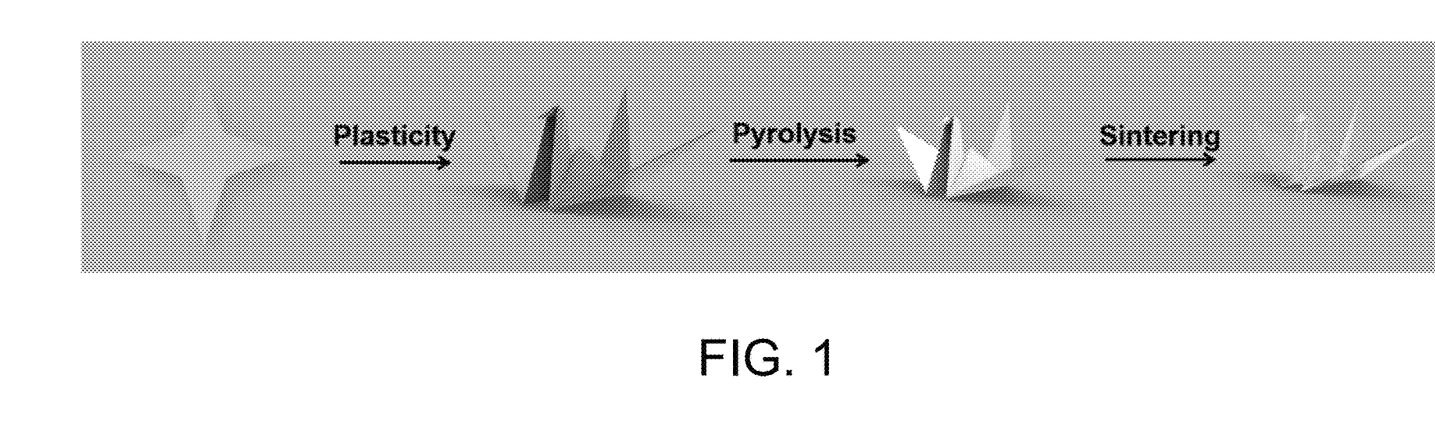
FIG. 1 is a schematic diagram of the fabricating method of transparent glass with both sharp angles and complex three-dimensional structures through origami/kirigami techniques.
Figure 2:
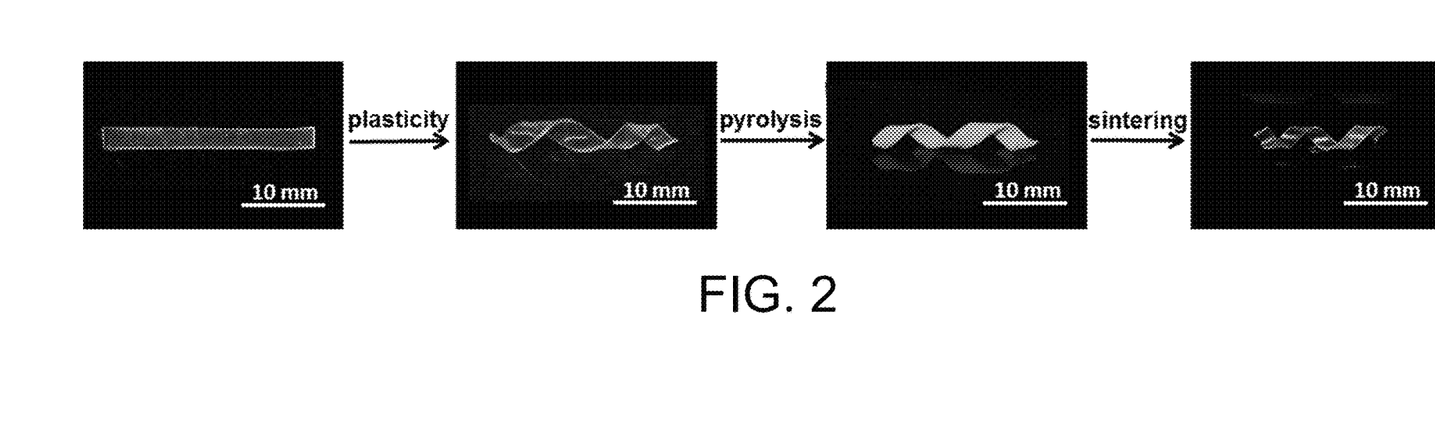
FIG. 2 is the picture of the glass with three-dimensional structures.

Origami/Kirigami Shaping and Thermal Treatment:

Polymer-glass composite with original specific shape was prepared using laser cutting machine with programs set in advance. After origami/kirigami shaping (for example, performing the origami/kirigami shaping shown in FIG. 1), the shape was fixed by the external force then the composite was put into the oven of 120° C. for 3 h to prepare complex 3D permanent shape. The shaped precursor composite was thermally treated in muffle furnace. The thermal treatment program is heating up at a rate of 1° C./min to 600° C., keeping 600° C. for 2 h, then at a rate of 2° C./min to 1000° C., then keeping 1000° C. for 2 h, finally cooling naturally. After debinding, the green body was thermally treated in a vacuum furnace under −0.01 MPa. The thermal treatment program is heating up at a rate of 3° C./min to 1000° C., then at a rate of 1° C./min to 1200° C., then keeping 1200° C. for 2 h, finally cooling naturally.

The transparency of the sample in present example is 85%.

Example 2 (Disulfide Bonds, the Dynamic Bond Contained in the Molecule which is Introduced into the Network)

The reagent and the source thereof used in Example 2 is represented in Table 2 below.

TABLE 2

| used reagent | molecular formula | manufacturer |
| --- | --- | --- |
| 2,2'-dithiodiethanol | $C_4H_{10}O_2S_2$ | Shanghai Aladdin Bio-Chem Technology |
| dibutyltin dilaurate (DBTDL) | $C_{32}H_{64}O_4Sn$ | J&K Scientific |
| hexamethylene diisocyanate (HDI) | $OCN(CH_2)_6NCO$ | Shanghai Aladdin Bio-Chem Technology |
| glycerol | $C_3H_8O_3$ | J&K Scientific |
| silica powder R972 | $SiO_2$ | EVONIK |

Synthesis of Polymer-Glass Powder Composite Containing Disulfide Bonds:

4.62 g of 2,2'-dithiodiethanol, 5.04 g of hexamethylene diisocyanate, 1.84 g of glycerol, 0.05 g of DBTDL, 0.1 g of Irgacure 2959 and 6.6 g of silica R972 were introduced into a 50 ml glass beaker. Then the precursor liquid was poured into the mold and cured at 70° C. for 24 h, so as to obtain the polymer-glass powder composite containing disulfide bonds.

Origami Shaping and Thermal Treatment:
As Example 1 is shown.
The transparency of the sample in present example is 85%.

Example 3 (D-A Bonds, the Dynamic Bond Introduced into the Network Through Chemical Reaction)

The reagent and the source thereof used in Example 3 is represented in Table 3 below.

TABLE 3

| used reagent | molecular formula | manufacturer |
| --- | --- | --- |
| furfuramine | $C_5H_7NO$ | TCI shanghai |
| 2,2-bis (4-glycidoxyphenyl)-propane (BGPP) | $C_{21}H_{24}O_4$ | TCI shanghai |
| N,N'-(4,4'-methylenediphenyl) bismaleimide (BM) | $C_{21}H_{14}N_2O_4$ | Sigma-Aldrich China |
| phenoxyethanol (POE) | $C_8H_{10}O_2$ | Shanghai Aladdin Bio-Chem Technology |
| silica powder R972 | $SiO_2$ | EVONIK |

Synthesis of Polymer-Glass Powder Composite Containing D-A Bonds:

7.5 g of furfuramine and 7 g of 2,2-bis (4-glycidoxyphenyl)-propane and were dissolved into 30 ml of N,N-dimethylformamide at 120° C. and reacted for 12 h. Then 5.6 g of N,N'-(4,4'-methylenediphenyl) bismaleimide, 2.6 g of POE and 8.4 g of 8972 were added into the precursor. Then the liquid precursor was poured into the reaction cell and cured at 70° C. for 10 h. The composite was prepared after stoving at 80° C. for 24 h.

Origami/Kirigami Shaping and Thermal Treatment:
As Example 1 is shown.
The transparency of the sample in present example is 90%.

Example 4 (Urethane Bonds, the Dynamic Bond Introduced into the Network Through Chemical Reaction)

The reagent and the source thereof used in Example 4 is represented in Table 4 below.

TABLE 4

| used reagent | molecular formula | manufacturer |
|---|---|---|
| 2-hydroxyethyl acrylate | $C_5H_8O_3$ | Shanghai Aladdin Bio-Chem Technology |
| dibutyltin dilaurate (DBTDL) | $C_{32}H_{64}O_4Sn$ | J&K Scientific |
| hexamethylene diisocyanate (HDI) | $OCN(CH_2)_6NCO$ | Shanghai Aladdin Bio-Chem Technology |
| Irgacure 2959 | $C_{12}H_{16}O_4$ | Sigma-Aldrich China |
| silica powder R972 | $SiO_2$ | EVONIK |

Synthesis of Polyurethane Acrylate (PUA):

10 g of 2-hydroxyethyl acrylate, 3.7 g of hexaethylene diisocyanate and 0.4 g of DBTDL were mixed. Then the mixture was stirred at 70° C. for 4 h. The PUA was prepared then.

Synthesis of Polymer-Glass Powder Composite Containing Urethane Bonds:

6 g PUA and 3.6 g of R972 were introduced into 10 g of N,N-dimethylformamide. Then the liquid transparent precursor was poured into the glass cell and treated for 1 min by UV light with 385 nm. The composite was prepared after stoving.

Origami/Kirigami Shaping and Thermal Treatment:

As Example 1 is shown.

The transparency of the sample in present example is 85%.

Example 5 (Hydrogen Bonds)

The reagent and the source thereof used in Example 5 is represented in Table 5 below.

TABLE 5

| used reagent | molecular formula | manufacturer |
|---|---|---|
| 2-amino-4-hydroxy-6-methylpyrimidine (Upy) | $C_5H_7N_3O$ | Sigma-Aldrich China |
| 2-isocyanatoethyl acrylate | $C_6H_7NO_3$ | TCI shanghai |
| polyethylene glycol diacrylate (PEGDA, $M_n = 700$) | $(C_2H_4O)_n (C_3H_2O_2)_2$ | Sigma-Aldrich China |
| triethylamine | $C_6H_{15}N$ | J&K Scientific |
| pentaerythritol tetrakis(3-mercaptopropionate) (PTME) | $(C_4H_7O_2S)_4C$ | Sigma-Aldrich China |
| silica powder OX50 | $SiO_2$ | EVONIK |

Synthesis of 2-Amino-4-Hydroxy-6-Methylpyrimidine Acrylate (UPyA):

3.75 g of 2-amino-4-hydroxy-6-methylpyrimidine and 4.65 g of 2-isocyanatoethyl acrylate were dissolved into 30 ml of dimethyl sulfoxide at 150° C. Then the mixture was stirred at 150° C. for 15 min. After then, white precipitation was obtained by cooling at room temperature. Finally, the precipitation after suction filtration was vacuum dried for 24 h to obtain UPyA.

Synthesis of Polymer-Glass Powder Composite Containing Hydrogen Bonds:

7.5 g of UPyA, 7 g of polyethylene glycol diacrylate ($M_n=700$), 1.84 g of Pentaerythritol tetrakis(3-mercaptopropionate), 0.8 g of Triethylamine and 8.4 g of R972 were dissolved into 20 ml of N,N-Dimethylformamide at 80° C. Then the liquid precursor was poured into the reaction cell and cured at 80° C. for 6 h. The composite was prepared after stoving at 80° C. for 24 h.

Origami/Kirigami Shaping and Thermal Treatment:

As Example 1 is shown.

The transparency of the sample in present example is 85%.

Example 6 (Hydrogel-Ionic Bonds)

The reagent and the source thereof used in Example 6 is represented in Table 6 below.

TABLE 6

| used reagent | molecular formula | manufacturer |
|---|---|---|
| sodium alginate | $(C_6H_7O_6Na)_n$ | Sigma-Aldrich China |
| calcium dichloride | $CaCl_2$ | TCI shanghai |
| silica powder OX50 | $SiO_2$ | EVONIK |

Synthesis of Hydrogel-Glass Powder Composite Containing Ionic Bonds:

5 g of sodium alginate, 10 g of water and 5 g of OX50 were mixed. Then 0.05 g of calcium dichloride was introduced to the solution. The obtained precursor was poured into mold and cured for 24 h.

Origami/Kirigami Shaping and Thermal Treatment:

Polymer-glass composite with original specific shape was prepared using a manual cutter. After origami/kirigami shaping, the shape was fixed then the composite was put into water for 24 h to prepare complex 3D permanent shape. Then the hydrogel was dried at 100° C. for 24 h. The shaped composite was thermally treated in muffle furnace. The thermal treatment program is heating up at a rate of 1° C./min to 600° C., keeping 600° C. for 2 h, then at a rate of 2° C./min to 1000° C., then keeping 1000° C. for 2 h, finally cooling naturally. After debinding, the green body was thermally treated in a vacuum furnace under −0.01 MPa. The thermal treatment program is heating up at a rate of 3° C./min to 1000° C., then at a rate of 1° C./min to 1200° C., then keeping 1200° C. for 2 h, finally cooling naturally.

The transparency of the sample in present example is 80%.

Example 7 (Glass Powder with Low Melting Point)

The reagent and the source thereof used in Example 7 is represented in Table 7 below.

TABLE 7

| used reagent | molecular formula | manufacturer |
| --- | --- | --- |
| poly(caprolactone) diacrylate (PCL) | $C_4H_8O_3(C_6H_{10}O_2)_n$ | Sigma-Aldrich China |
| 2-isocyanatoethyl acrylate | $C_6H_7NO_3$ | TCI shanghai |
| dibutyltin dilaurate (DBTDL) | $C_{32}H_{64}O_4Sn$ | J&K Scientific |
| butyl acrylate | $C_7H_{12}O_3$ | TCI shanghai |
| phenoxyethanol (POE) | $C_8H_{10}O_2$ | Shanghai Aladdin Bio-Chem Technology |
| glass powder with low melting point (melting point of 600° C.) | $SiO_2$ | EVONIK |
| Irgacure 2959 | $C_{12}H_{16}O_4$ | Sigma-Aldrich China |

Synthesis of Poly(Caprolactone) Diacrylate (PCLDA):

As Example 1 is shown.

Synthesis of Polymer-Glass Powder (Low Melting Point) Composite Containing Ester Bond:

6 g PCLDA, 0.6 g of hydroxybutyl acrylate, 1 g of phenoxetol, 0.03 g of DBTDL, 0.06 g of Irgacure 2959 and 3.6 g of glass powder with a low melting point were introduced into 10 g of N,N-dimethylformamide. Then the liquid transparent precursor was poured into the glass cell and treated for 1 min by UV light with 385 nm. The composite was prepared after stoving.

Origami/Kirigami Shaping and Thermal Treatment:

Polymer-glass composite with original specific shape was prepared using laser cutting with programs set in advance. After origami/kirigami shaping, the shape was fixed then the composite was put into the oven of 120° C. for 3 h to prepare complex 3D permanent shape. The shaped composite was thermally treated in a muffle furnace. The thermal treatment program is heating up at a rate of 1° C./min to 600° C., keeping 600° C. for 2 h, finally cooling naturally.

The transparency of the sample in present example is 90%.

Example 8 (Glass Powder Obtained Through Sol-Gel)

The reagent and the source thereof used in Example 8 is represented in Table 8 below.

TABLE 8

| used reagent | molecular formula | manufacturer |
| --- | --- | --- |
| poly(caprolactone) diacrylate (PCL) | $C_4H_8O_3(C_6H_{10}O_2)_n$ | Sigma-Aldrich China |
| 2-isocyanatoethyl acrylate | $C_6H_7NO_3$ | TCI shanghai |
| dibutyltin dilaurate (DBTDL) | $C_{32}H_{64}O_4Sn$ | J&K Scientific |
| butyl acrylate | $C_7H_{12}O_3$ | TCI shanghai |
| phenoxyethanol (POE) | $C_8H_{10}O_2$ | Shanghai Aladdin Bio-Chem Technology |
| tetraethylorthosilicate | $Si(OC_2H_5)_4$ | J&K Scientific |
| Irgacure 2959 | $C_{12}H_{16}O_4$ | Sigma-Aldrich China |

Synthesis of Glass Powder by Sol-Gel:

9.62 g of tetraethylorthosilicate, 6.82 g of ethanol and 5.76 g of water were mixed and the pH of the solution was adjusted to 2 using hydrochloric acid. The reaction solution was then stirred at 30° C. for 12 h and dried at 80° C. for 24 h. Glass powder was obtained after grinding.

Synthesis of Poly(Caprolactone) Diacrylate (PCLDA):

As Example 1 is shown.

Synthesis of Polymer-Glass Powder Composite Containing Ester Bond:

6 g PCLDA, 0.6 g of hydroxybutyl acrylate, 1 g of phenoxetol, 0.03 g of DBTDL, 0.06 g of Irgacure 2959 and 3.6 g of sol-gel glass powder were introduced into 10 g of N,N-dimethylformamide. Then the liquid transparent precursor was poured into the glass cell and treated for 1 min by UV light with 385 nm. The composite was prepared after stoving.

Origami/Kirigami Shaping and Thermal Treatment:

As Example 1 is shown.

The transparency of the sample in present example is 95%.

Example 9 (Color-Developing Components is Added)

The reagent and the source thereof used in Example 9 is represented in Table 9 below.

TABLE 9

| used reagent | molecular formula | manufacturer |
|---|---|---|
| poly(caprolactone) diacrylate (PCL) | $C_4H_8O_3(C_6H_{10}O_2)_n$ | Sigma-Aldrich China |
| 2-isocyanatoethyl acrylate | $C_6H_7NO_3$ | TCI shanghai |
| dibutyltin dilaurate (DBTDL) | $C_{32}H_{64}O_4Sn$ | J&K Scientific |
| butyl acrylate | $C_7H_{12}O_3$ | TCI shanghai |
| phenoxyethanol (POE) | $C_8H_{10}O_2$ | Shanghai Aladdin Bio-Chem Technology |
| silica powder R972 | $SiO_2$ | EVONIK |
| chromium nitrate nonahydrate | $Cr(NO_3)_3 \cdot 9H_2O$ | Shanghai Aladdin Bio-Chem Technology |
| Irgacure 2959 | $C_{12}H_{16}O_4$ | Sigma-Aldrich China |

Synthesis of Poly(Caprolactone) Diacrylate (PCLDA):
As Example 1 is shown.
Synthesis of Functional Polymer-Glass Powder Composite Containing Ester Bonds:
6 g PCLDA, 0.6 g of hydroxybutyl acrylate, 1 g of phenoxetol, 0.03 g of DBTDL, 0.06 g of Irgacure 2959, 3.6 g of R972 and 0.06 g of chromium nitrate nonahydrate were introduced into 10 g of N,N-dimethylformamide. Then the liquid transparent precursor was poured into the glass cell and treated for 1 min by UV light with 385 nm. The composite was prepared after stoving.
Origami/Kirigami Shaping and Thermal Treatment:
As Example 1 is shown.
The final origami/kirigami glass is transparent and green. The transparency of the sample in present example is 75%.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for preparing three-dimensional transparent glass through polymer plasticity, including the following steps:
   step 1: synthesizing a polymer-glass powder composite containing dynamic chemical bonds, wherein a bond exchange catalyst is added during the synthesis process, and then curing to obtain a two-dimensional sheet shape I;
   step 2: shaping the two-dimensional sheet shape I obtained in step 1 into a complex three-dimensional shape II; and using an external force and activating the dynamic chemical bonds via the bond exchange catalyst to fix a shape of the complex three-dimensional shape II; and
   step 3: pyrolyzing the complex three-dimensional shape II at a temperature ranging from 400° C.-1500° C. to obtain the transparent glass with the complex three-dimensional shape II.

2. The method for preparing three-dimensional transparent glass through polymer plasticity of claim 1, wherein the dynamic chemical bonds are one or more than one of dynamic covalent bonds or dynamic noncovalent bonds, wherein the dynamic covalent bonds include one or more than one of ester bonds, diene addition bonds, disulfide bonds, urethane bonds, alkoxyamine bonds, thioether, trithiocarbonate, carbon-carbon bonds, acylhydrazone bonds, oxime bonds, urea bonds, thiourea bonds, borate bonds, boroxine bonds, selenoether, and diselenide, and the dynamic non-covalent bonds include one or more than one of hydrogen bonds, ionic bonds, and delocalized π bonds.

3. The method for preparing three-dimensional transparent glass through polymer plasticity of claim 1, wherein the mass fraction of the bond exchange catalyst in the polymer-glass powder composite ranges from 0.01-5% in step 1.

4. The method for preparing three-dimensional transparent glass through polymer plasticity of claim 3, wherein the bond exchange catalyst includes one or more than one of calcium salts, magnesium salts, stannous octoate, dibutyltin dilaurate, titanates, zirconates, organic acids, organic bases, inorganic acids and inorganic bases in step 1.

5. The method for preparing three-dimensional transparent glass through polymer plasticity of claim 1, wherein the bond exchange catalyst includes one or more than one of calcium salts, magnesium salts, stannous octoate, dibutyltin dilaurate, titanates, zirconates, organic acids, organic bases, inorganic acids and inorganic bases in step 1.

6. The method for preparing three-dimensional transparent glass through polymer plasticity of claim 1, wherein a glass powder in the polymer-glass powder composite includes one or more than one of quartz glass powder, borosilicate glass powder, aluminosilicate glass powder, soda-lime glass powder, lead silica glass powder, and sodium boron glass powder, the particle size of the glass powder is in the range of 10 nm-100 μm, and the mass fraction of the glass powder in the total mass of the composite is 5%-80%.

7. The method for preparing three-dimensional transparent glass through polymer plasticity of claim 1, further adding functional components when synthesizing the polymer-glass powder composite in step 1, and the functional components include one or more than one of color-developing components, conductive components and magnetic components.

8. The method for preparing three-dimensional transparent glass through polymer plasticity of claim 1, wherein the method for shaping the two-dimensional sheet shape I obtained in step 1 into the three-dimensional shape II in step 2 includes one or more than one of origami and kirigami, the three-dimensional shape II includes sharp structures.

9. The method for preparing three-dimensional transparent glass through polymer plasticity of claim 8, wherein the process of origami includes one or more than one of valley fold, mountain fold, sinking, rolling, crimp fold, pleat fold, and reverse fold, the shape fabricated by origami includes one or more than one of Miura Fold, Yoshimura Mode, Triangle Helix, Torsion Box, sailboat base, frog base, windmill base, fish base, bird base and waterbomb base, and the process of kirigami includes one or more than one of folding, piercing, inkjet printing, and sketching.

10. The method for preparing three-dimensional transparent glass through polymer plasticity of claim 1, wherein a sintering aid is introduced in the synthesize process in step 1.

* * * * *